Feb. 25, 1930. H. J. HOWELL 1,748,771
SPECTACLES
Filed June 5, 1928
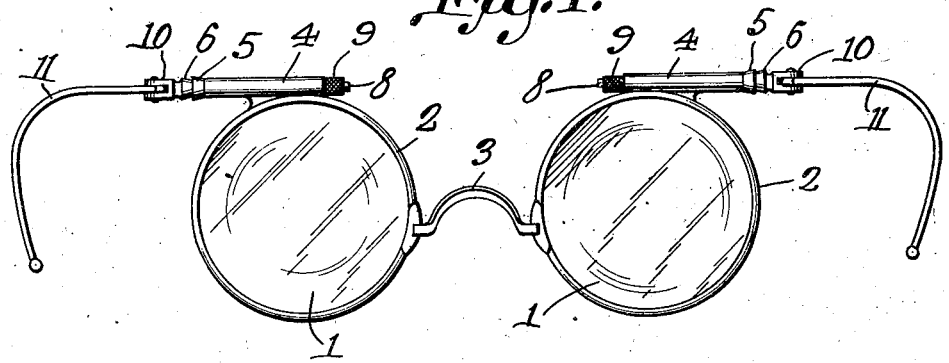
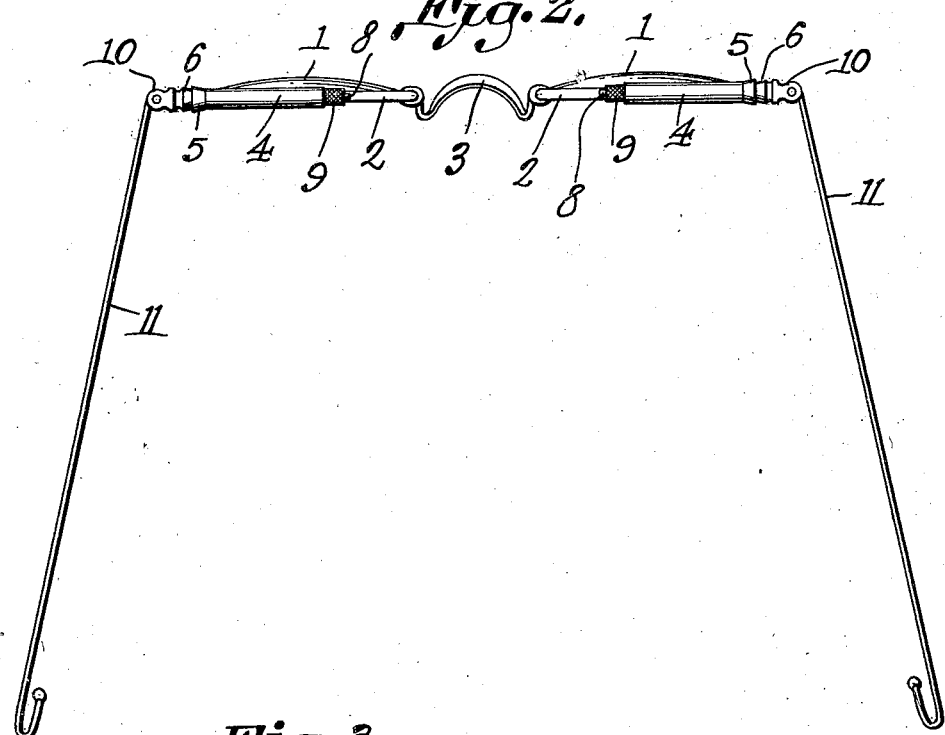
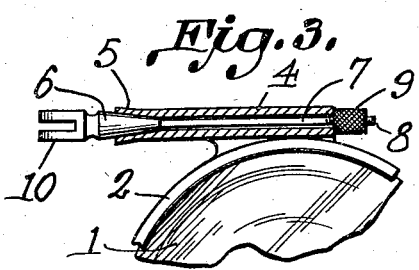
H. J. Howell
Inventor
By C. A. Snow & Co.
Attorneys Patented Feb. 25, 1930

1,748,771

UNITED STATES PATENT OFFICE

HERCULES J. HOWELL, OF WASHINGTON, DISTRICT OF COLUMBIA

SPECTACLES

Application filed June 5, 1928. Serial No. 283,970.

This invention relates to spectacles designed primarily to be worn by chauffeurs and other drivers of vehicles. Spectacles as generally constructed are provided with bows extending from the sides of the frame. Being thus located they tend to obstruct the view through either side and, therefore, are objectionable.

It is an object of the present invention to provide spectacles having bows connected thereto at the tops of the lenses so that the bows will thus be elevated where they will not obstruct the vision.

A further object is to so connect the bows to the lenses as to permit easy adjustment to insure proper positioning of the lenses while the bows are in engagement with the ears of the wearer.

A further object is to provide simple and efficient means for holding the parts in proper positions relative to each other after they have been adjusted.

With the foregoing and other objects in view which will appear as the description proceeds the invention resides in the combination and arrangement of parts and in the details of construction hereinafter described and claimed it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is an elevation of one form of spectacles embodying the present improvements.

Figure 2 is a top plan view thereof.

Figure 3 is an enlarged section through the adjustable connection between one of the bows and one of the lenses.

Referring to the figures by characters of reference 1 designates the lenses of a pair of spectacles. In the structure illustrated these lenses are mounted in a frame 2 including a bridge 3. It is to be understood, however, that if preferred, instead of mounting the lenses in a light metal frame such as illustrated, they can be used with a shell frame or can be mounted without a frame. Where a frame is used a small sleeve 4 is connected to the top thereof above each lens, the two sleeves alining and the outer ends of the sleeves being slightly flared as shown at 5.

Seated within the flared portion of each sleeve 4 is a conical wedging collar 6 from the small end of which is extended a stem 7 having a screw threaded end 8 which projects from that end of the sleeve nearest the bridge 3. On this threaded portion is mounted a nut 9 which can be of any suitable configuration. By tightening the nut the wedging collar 6 will of course be drawn tightly into the flared portion 5 of the sleeve so as thus to be held against rotation. A small fork 10 is carried by the outer end of the wedging collar 6 and pivotally mounted in this fork is a bow 11 of the usual or any preferred construction.

In using the spectacles the nuts 9 are loosened on the threaded portions 8 of the stems 7, the bridge 3 is placed on the nose of the wearer, and the bows 11 are positioned in engagement with the ears. The spectacles are then tilted so that the lenses will be supported at the correct angles in front of the eyes. While they are thus held the nuts 9 are tightened, drawing the wedging collars 6 into the flared portions 5 so that it thus becomes impossible for the sleeves 4 to rotate on the wedging collars.

It has been found in practice that where the bows are connected as described to the top portions of the lenses, it is desirable to lower the bridge 3 relative to the frame as shown in Figure 1. By thus arranging the bridge the lenses, when tilted, will not be brought too close to the face at points below the eyes.

As before stated the bows can be connected to different types of spectacles. If the spectacles are formed with shell frames, the sleeve portions can be made integral with the shell frame. If rimless spectacles are employed the sleeves 4 can be fastened to the tops of the lenses by rivets. Such an arrangement is so obvious that illustration thereof is not deemed necessary.

Importance is attached to the fact that, by constructing the spectacles as described, the bows are not only elevated so as not to obstruct the vision, but the lenses can be easily adjusted to stand at the correct angles relative to the eyes of the wearer.

What is claimed is:

The combination with the lenses of a pair of spectacles, of tubular members connected to the top portions of the lenses, a stem adjustable longitudinally within each of said members, a wedging element carried by each stem, and a bow pivotally connected to each wedging element, the said bows being mounted for lateral and up and down swinging movement relative to the lenses.

In testimony that I claim the foregoing as my own, I have hereto affixed my signature.

HERCULES J. HOWELL.